(12) United States Patent
Eryurek et al.

(10) Patent No.: US 6,505,517 B1
(45) Date of Patent: Jan. 14, 2003

(54) HIGH ACCURACY SIGNAL PROCESSING FOR MAGNETIC FLOWMETER

(75) Inventors: Evren Eryurek, Minneapolis, MN (US); Rong Gao, West Lafayette, IN (US); Lefteri H. Tsoukalas, West Lafayette, IN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/360,473

(22) Filed: Jul. 23, 1999

(51) Int. Cl.[7] ................................................ G01F 1/56
(52) U.S. Cl. ........................ 73/861.08; 73/861.11; 702/45; 702/189
(58) Field of Search ................ 73/861.08, 861.11, 73/861.09, 861.12, 861.13; 702/45, 46, 50, 189

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart et al. | 128/2.05 |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,855,858 A | 12/1974 | Cushing | 73/194 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,337,516 A | 6/1982 | Murphy et al. | 364/551 |
| 4,399,824 A | 8/1983 | Davidson | 128/736 |
| 4,517,468 A | 5/1985 | Kemper et al. | 290/52 |
| 4,530,234 A | 7/1985 | Cullick et al. | 73/53 |
| 4,571,689 A | 2/1986 | Hildebrand et al. | 364/481 |

(List continued on next page.)

FOREIGN PATENT DOCUMENTS

| | | |
|---|---|---|
| DE | 32 13 866 A1 | 10/1983 |
| DE | 35 40 204 C1 | 9/1986 |
| DE | 40 08 560 A1 | 9/1990 |

(List continued on next page.)

OTHER PUBLICATIONS

"Smart Field Devices Provide New Process Data, Increase System Flexibility," by Mark Boland, *I&CS*, Nov. 1994, pp. 45–51.

"Wavelet Analysis of Vibration, Part I: Theory[1]," by D.E. Newland, *Journal of Vibration and Acoustics*, vol. 116, Oct. 1994, pp. 409–416.

(List continued on next page.)

*Primary Examiner*—Benjamin R. Fuller
*Assistant Examiner*—Corey D. Mack
(74) *Attorney, Agent, or Firm*—Westman, Champlin & Kelly, P.A.

(57) ABSTRACT

A magnetic flowmeter for measuring flow of a conductive fluid includes a flow tube assembly adapted to receive a fluid flow and a coil configured to apply a magnetic field in the fluid flow through the flow tube. An EMF sensor coupled to the flow tube provides an EMF output related to an EMF generated in the fluid flow due to the applied magnetic field, velocity of the fluid and noise. A signal processor includes a wavelet transformer that performs a wavelet transformation on the EMF output and provides a decomposition signal related to velocity of the fluid.

38 Claims, 9 Drawing Sheets

U.S. PATENT DOCUMENTS

| | | | | |
|---|---|---|---|---|
| 4,635,214 A | 1/1987 | Kasai et al. ................. 364/551 |
| 4,642,782 A | 2/1987 | Kemper et al. ............. 364/550 |
| 4,644,479 A | 2/1987 | Kemper et al. ............. 364/550 |
| 4,649,515 A | 3/1987 | Thompson et al. .......... 364/900 |
| 4,668,473 A | 5/1987 | Agarwal ...................... 422/62 |
| 4,707,796 A | 11/1987 | Calabro et al. .............. 364/552 |
| 4,720,806 A | 1/1988 | Schippers et al. ........... 364/551 |
| 4,736,367 A | 4/1988 | Wroblewski et al. ......... 370/85 |
| 4,736,763 A | 4/1988 | Britton et al. ................. 137/10 |
| 4,777,585 A | 10/1988 | Kokawa et al. .............. 364/164 |
| 4,831,564 A | 5/1989 | Suga ..................... 364/551.01 |
| 4,841,286 A | 6/1989 | Kummer ...................... 340/653 |
| 4,873,655 A | 10/1989 | Kondraske ................... 364/553 |
| 4,907,167 A | 3/1990 | Skeirik ........................ 364/500 |
| 4,924,418 A | 5/1990 | Backman et al. ............ 364/550 |
| 4,934,126 A * | 6/1990 | Romano ................... 73/861.38 |
| 4,934,196 A | 6/1990 | Romano ................... 73/861.38 |
| 4,939,753 A | 7/1990 | Olson ......................... 375/107 |
| 4,964,125 A | 10/1990 | Kim ........................... 371/15.1 |
| 4,988,990 A | 1/1991 | Warrior ...................... 340/25.5 |
| 4,992,965 A | 2/1991 | Holter et al. ........... 364/551.01 |
| 5,005,142 A | 4/1991 | Lipchak et al. .............. 364/550 |
| 5,043,862 A | 8/1991 | Takahashi et al. ........... 364/162 |
| 5,053,815 A | 10/1991 | Wendell ...................... 355/208 |
| 5,067,099 A | 11/1991 | McCown et al. ............ 364/500 |
| 5,081,598 A | 1/1992 | Bellows et al. .............. 364/550 |
| 5,089,979 A | 2/1992 | McEachern et al. ... 364/571.04 |
| 5,089,984 A | 2/1992 | Struger et al. ............... 395/650 |
| 5,098,197 A | 3/1992 | Shepard et al. ............. 374/120 |
| 5,099,436 A | 3/1992 | McCown et al. ............ 364/550 |
| 5,103,409 A | 4/1992 | Shimizu et al. .............. 364/556 |
| 5,111,531 A | 5/1992 | Grayson et al. ............... 395/23 |
| 5,121,467 A | 6/1992 | Skeirik ......................... 395/11 |
| 5,122,794 A | 6/1992 | Warrior .................... 340/825.2 |
| 5,122,976 A | 6/1992 | Bellows et al. .............. 364/550 |
| 5,130,936 A | 7/1992 | Sheppard et al. ..... 364/551.01 |
| 5,134,574 A | 7/1992 | Beaverstock et al. ... 364/551.01 |
| 5,137,370 A | 8/1992 | McCullock et al. ......... 374/173 |
| 5,142,612 A | 8/1992 | Skeirik ......................... 395/11 |
| 5,143,452 A | 9/1992 | Maxedon et al. ............ 374/170 |
| 5,148,378 A | 9/1992 | Shibayama et al. .... 364/571.07 |
| 5,167,009 A | 11/1992 | Skeirik ......................... 395/27 |
| 5,175,678 A | 12/1992 | Frerichs et al. .............. 364/148 |
| 5,193,143 A | 3/1993 | Kaemmerer et al. .......... 395/51 |
| 5,197,114 A | 3/1993 | Sheirik ......................... 395/22 |
| 5,197,328 A | 3/1993 | Fitzgerald .................... 73/168 |
| 5,212,765 A | 5/1993 | Skeirik ......................... 395/11 |
| 5,214,582 A | 5/1993 | Gray ..................... 364/424.03 |
| 5,224,203 A | 6/1993 | Sheirik ......................... 395/22 |
| 5,228,780 A | 7/1993 | Shepard et al. ............. 374/175 |
| 5,235,527 A | 8/1993 | Ogawa et al. ......... 364/571.05 |
| 5,265,031 A | 11/1993 | Malczewski ................. 364/497 |
| 5,265,222 A | 11/1993 | Nishiya et al. ................. 395/3 |
| 5,269,311 A | 12/1993 | Kirchner et al. ............. 128/672 |
| 5,274,572 A | 12/1993 | O'Neill et al. ............... 364/550 |
| 5,282,131 A | 1/1994 | Rudd et al. .................. 364/164 |
| 5,282,261 A | 1/1994 | Sheirik ......................... 395/22 |
| 5,293,585 A | 3/1994 | Morita ......................... 395/52 |
| 5,303,181 A | 4/1994 | Stockton ....................... 365/96 |
| 5,305,230 A | 4/1994 | Matsumoto et al. ......... 364/495 |
| 5,311,421 A | 5/1994 | Nomura et al. .............. 364/157 |
| 5,317,520 A | 5/1994 | Castle ......................... 364/482 |
| 5,327,357 A | 7/1994 | Feinstein et al. ............. 364/502 |
| 5,333,240 A | 7/1994 | Matsumoto et al. ........... 395/23 |
| 5,347,843 A | 9/1994 | Orr et al. .......................... 73/3 |
| 5,349,541 A | 9/1994 | Alexandro, Jr. et al. .... 364/578 |
| 5,357,449 A | 10/1994 | Oh ........................ 364/551.01 |
| 5,361,628 A | 11/1994 | Marko et al. ................. 73/116 |
| 5,365,423 A | 11/1994 | Chand ........................ 364/140 |
| 5,365,787 A | 11/1994 | Hernandez et al. ........... 73/660 |
| 5,367,612 A | 11/1994 | Bozich et al. ................. 395/22 |
| 5,384,699 A | 1/1995 | Levy et al. ............ 364/413.13 |
| 5,386,373 A | 1/1995 | Keeler et al. ................ 364/577 |
| 5,388,465 A | 2/1995 | Okaniwa et al. .......... 73/861.17 |
| 5,394,543 A | 2/1995 | Hill et al. .................... 395/575 |
| 5,404,064 A | 4/1995 | Mermelstein et al. ........ 310/319 |
| 5,408,406 A | 4/1995 | Mathur et al. ............... 364/163 |
| 5,408,586 A | 4/1995 | Sheirik ......................... 395/23 |
| 5,414,645 A | 5/1995 | Hirano ................... 364/551.01 |
| 5,419,197 A | 5/1995 | Ogi et al. ...................... 73/659 |
| 5,430,642 A | 7/1995 | Nakajima et al. ............ 364/148 |
| 5,436,705 A | 7/1995 | Raj ............................. 355/246 |
| 5,440,478 A | 8/1995 | Fisher et al. ................. 364/188 |
| 5,442,639 A | 8/1995 | Crowder et al. ............. 371/20.1 |
| 5,467,355 A | 11/1995 | Umeda et al. .......... 364/571.04 |
| 5,469,070 A | 11/1995 | Koluvek ...................... 324/713 |
| 5,469,156 A | 11/1995 | Kogura .................... 340/870.38 |
| 5,469,735 A | 11/1995 | Watanabe ................... 73/118.1 |
| 5,469,749 A | 11/1995 | Shimada et al. .......... 73/861.47 |
| 5,481,199 A | 1/1996 | Anderson et al. ............ 324/705 |
| 5,483,387 A | 1/1996 | Bauhahn et al. ............. 359/885 |
| 5,485,753 A | 1/1996 | Burns et al. ................... 73/720 |
| 5,486,996 A | 1/1996 | Samad et al. ................. 364/152 |
| 5,488,697 A | 1/1996 | Kaemmerer et al. .......... 395/51 |
| 5,489,831 A | 2/1996 | Harris ......................... 318/701 |
| 5,495,769 A | 3/1996 | Borden et al. ................. 73/718 |
| 5,510,779 A | 4/1996 | Maltby et al. ............ 340/870.3 |
| 5,511,004 A | 4/1996 | Dubost et al. .......... 364/551.01 |
| 5,526,293 A | 6/1996 | Mozumder et al. .......... 364/578 |
| 5,539,638 A | 7/1996 | Keeler et al. ........... 364/424.03 |
| 5,548,528 A | 8/1996 | Keeler et al. ................ 364/497 |
| 5,560,246 A | 10/1996 | Bottinger et al. ......... 73/861.15 |
| 5,561,599 A | 10/1996 | Lu ............................... 364/164 |
| 5,570,300 A | 10/1996 | Henry et al. ............ 364/551.01 |
| 5,572,420 A | 11/1996 | Lu ............................... 364/153 |
| 5,573,032 A | 11/1996 | Lenz et al. ................... 137/486 |
| 5,591,922 A | 1/1997 | Segeral et al. ............ 73/861.04 |
| 5,598,521 A | 1/1997 | Kilgore et al. ............... 395/326 |
| 5,600,148 A | 2/1997 | Cole et al. ................. 250/495.1 |
| 5,623,605 A | 4/1997 | Keshav et al. .......... 395/200.17 |
| 5,633,809 A | 5/1997 | Wissenbach et al. ........ 364/510 |
| 5,637,802 A | 6/1997 | Frick et al. .................... 73/724 |
| 5,640,491 A | 6/1997 | Bhat et al. ..................... 395/22 |
| 5,661,668 A | 8/1997 | Yemini et al. ................ 364/550 |
| 5,665,899 A | 9/1997 | Willcox ......................... 73/1.63 |
| 5,669,713 A | 9/1997 | Schwartz et al. ............... 374/1 |
| 5,671,335 A | 9/1997 | Davis et al. ................... 395/23 |
| 5,675,504 A | 10/1997 | Serodes et al. .............. 364/496 |
| 5,675,724 A | 10/1997 | Beal et al. .............. 395/182.02 |
| 5,680,109 A | 10/1997 | Lowe et al. .................. 340/608 |
| 5,700,090 A | 12/1997 | Eryurek ....................... 374/210 |
| 5,703,575 A | 12/1997 | Kirkpatrick ............. 340/870.17 |
| 5,704,011 A | 12/1997 | Hansen et al. ................. 395/22 |
| 5,705,978 A | 1/1998 | Frick et al. ................... 340/511 |
| 5,708,211 A | 1/1998 | Jepson et al. ............ 73/861.04 |
| 5,708,585 A | 1/1998 | Kushion .................. 364/431.061 |
| 5,710,370 A | 1/1998 | Shanahan et al. ............ 73/1.35 |
| 5,713,668 A | 2/1998 | Lunghofer et al. ........... 374/179 |
| 5,719,378 A | 2/1998 | Jackson, Jr. et al. ......... 219/497 |
| 5,736,649 A | 4/1998 | Kawasaki et al. ........ 73/861.23 |
| 5,741,074 A | 4/1998 | Wang et al. ................. 374/185 |
| 5,742,845 A | 4/1998 | Wagner ....................... 395/831 |
| 5,746,511 A | 5/1998 | Eryurek et al. ................. 374/2 |
| 5,747,701 A | 5/1998 | Marsh et al. ............. 73/861.23 |
| 5,752,008 A | 5/1998 | Bowling ...................... 395/500 |
| 5,764,891 A | 6/1998 | Warrior .................... 395/200.2 |
| 5,781,878 A | 7/1998 | Mizoguchi et al. .......... 701/109 |
| 5,801,689 A | 9/1998 | Huntsman ................... 345/329 |
| 5,805,442 A | 9/1998 | Crater et al. ................. 364/138 |
| 5,817,950 A | 10/1998 | Wiklund et al. ......... 73/861.66 |
| 5,828,567 A | 10/1998 | Eryurek et al. ................ 700/79 |

| | | | | | | |
|---|---|---|---|---|---|---|
| 5,829,876 A | 11/1998 | Schwartz et al. ............... 374/1 | JP | 64-72699 | 3/1989 | |
| 5,848,383 A | 12/1998 | Yuuns ......................... 702/102 | JP | 2-5105 | 1/1990 | |
| 5,859,964 A | 1/1999 | Wang et al. ............ 395/185.01 | JP | 03229124 | 11/1991 | |
| 5,876,122 A | 3/1999 | Eryurek ........................ 374/183 | JP | 5-122768 | 5/1993 | |
| 5,880,376 A * | 3/1999 | Sai et al. .................. 73/861.08 | JP | 06242192 | 9/1994 | |
| 5,887,978 A | 3/1999 | Lunghofer et al. .......... 374/179 | JP | 7-63586 | 3/1995 | |
| 5,908,990 A | 6/1999 | Cummings ................ 73/861.22 | JP | 07234988 | 9/1995 | |
| 5,923,557 A | 7/1999 | Eidson ................... 364/471.03 | JP | 8-54923 | 2/1996 | |
| 5,924,086 A | 7/1999 | Mathur et al. ................. 706/25 | JP | 8-136386 | 5/1996 | |
| 5,926,778 A | 7/1999 | Pöppel ........................ 702/130 | JP | 8-166309 | 6/1996 | |
| 5,940,290 A | 8/1999 | Dixon ......................... 364/138 | JP | 08247076 | 9/1996 | |
| 5,956,663 A | 9/1999 | Eryurek et al. .............. 702/183 | JP | 2712625 | 10/1997 | |
| 5,970,430 A | 10/1999 | Burns et al. ................. 702/122 | JP | 2712701 | 10/1997 | |
| 6,014,902 A | 1/2000 | Lewis et al. .............. 73/861.12 | JP | 2753592 | 3/1998 | |
| 6,016,523 A | 1/2000 | Zimmerman et al. .......... 710/63 | JP | 07225530 | 5/1998 | |
| 6,016,706 A | 1/2000 | Yamamoto et al. .................. 9/6 | JP | 10-232170 | 9/1998 | |
| 6,017,143 A | 1/2000 | Eryurek et al. ................ 700/51 | JP | 11083575 | 3/1999 | |
| 6,038,579 A * | 3/2000 | Sekine ........................ 708/400 | WO | WO 94/25933 | 11/1994 | |
| 6,045,260 A | 4/2000 | Schwartz et al. ............ 374/183 | WO | WO 96/11389 | 4/1996 | |
| 6,047,220 A | 4/2000 | Eryurek et al. ................ 700/28 | WO | WO 96/12993 | 5/1996 | |
| 6,047,222 A | 4/2000 | Burns et al. .................... 700/79 | WO | WO 96/39617 | 12/1996 | |
| 6,052,655 A | 4/2000 | Kobayashi et al. .......... 702/184 | WO | WO 97/21157 | 6/1997 | |
| 6,072,150 A | 6/2000 | Sheffer ................... 219/121.83 | WO | WO 97/25603 | 7/1997 | |
| 6,112,131 A | 8/2000 | Ghorashi et al. ............ 700/142 | WO | WO 98/06024 | 2/1998 | |
| 6,119,047 A | 9/2000 | Eryurek et al. ................ 700/28 | WO | WO 98/13677 | 4/1998 | |
| 6,119,529 A | 9/2000 | DiMarco et al. .......... 73/861.68 | WO | WO 98/20469 | 5/1998 | |
| 6,192,281 B1 | 2/2001 | Brown et al. .................... 700/2 | WO | WO 00/70531 | 11/2000 | |
| 6,195,591 B1 | 2/2001 | Nixon et al. .................... 700/83 | | | | |
| 6,199,018 B1 | 3/2001 | Quist et al. ..................... 702/34 | | | | |
| 6,236,948 B1 | 5/2001 | Eck et al. ....................... 702/45 | | | | |
| 6,263,487 B1 | 7/2001 | Stripf et al. ..................... 717/1 | | | | |
| 6,298,377 B1 | 10/2001 | Hartikainen et al. ......... 709/223 | | | | |
| 6,311,136 B1 | 10/2001 | Henry et al. ................... 702/45 | | | | |
| 6,327,914 B1 | 12/2001 | Dutton ................... 73/861.356 | | | | |

FOREIGN PATENT DOCUMENTS

| | | |
|---|---|---|
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 299 17 651 U1 | 12/2000 |
| EP | 0 122 622 A1 | 10/1984 |
| EP | 0 413 814 A1 | 2/1991 |
| EP | 0 487 419 A2 | 5/1992 |
| EP | 0 512 794 A2 | 5/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| FR | 2 334 827 | 7/1977 |
| GB | 928704 | 6/1963 |
| GB | 1 534 280 | 11/1978 |
| GB | 2 310 346 A | 8/1997 |
| JP | 58-129316 | 8/1983 |
| JP | 59-116811 | 7/1984 |
| JP | 59163520 | 9/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 60174915 | 9/1985 |
| JP | 62-30915 | 2/1987 |
| JP | 64-1914 | 1/1989 |

OTHER PUBLICATIONS

"Wavelet Analysis of Vibration, Part 2: Wavelet Maps," by D.E. Newland, *Journal of Vibration and Acoustics*, vol. 116, Oct. 1994, pp. 417–425.

"Development and Applications of Neural Network Algorithms For Process Diagnostics," by R. Upadhyaya et al., *Proceedings of the 29th Conference on Decision and Control*, 1990, pp. 3277–3282.

"Fuzzy Logic and Artificial Neural Networks for Nuclear Power Plant Applications," by R.C. Berkan et al., *Processing of the American Power Conference*.

Parallel, Fault–Tolerant Control and Diagnostics System for Feedwater Regulation in PWRS, by E. Eryurek et al., *Proceedings of the American Power Conference*.

"Signal Processing, Data Handling and Communications: The Case of Measurement Validation", by M.P. Henry, *Department of Engineering Science, Oxford University*.

"Software–Based Fault–Tolerant Control Design for Improved Power Plant Operation," *IEEE/IFAC Joint Symposium on Computer–Aided Control System Design*, Mar. 7–9, 1994 pp. 585–590.

"Using Artificial Neural Networks to Identify Nuclear Power Plant States," by Israel E. Alguindndigue et al., pp. 1–4.

"Taking Full Advantage of Smart Transmitter Technology Now," by G. Orrison, *Control Engineering*, vol. 42, No. 1, Jan. 19

"Automated Generation of Nonlinear System Characterization for Sensor Failure Detection," by B.R. Upadhyaya et al., *ISA*, 1989 pp. 269–274.

"Application of Neural Networks for Sensor Validation and Plant Monitoring," by B. Upadhyaya et al., *Nuclear Technology*, vol. 97, No. 2, Feb. 1992 pp. 170–176.

"Applicications of Neural Computing Paradigms for Signal Validation," by B.R. Upadhyaya et al., *Department of Nuclear Engineering*, pp. 1–18.

"Field–based Architecture is Based on Open Systems, Improves Plant Performance", by P. Cleaveland, *I&CS*, Aug. 1996, pp. 73–74.

"Improving Dynamic Performance of Temperature Sensors With Fuzzy Control Techniques," by Wang Lei et al., pp. 872–873 (1992).

"Microsoft Press Computer Dictionary" 2nd Edition, 1994, Microsoft Press. p. 156.

"A TCP/IP Tutorial" by, Socolofsky et al., Spider Systems Limited, Jan. 1991 pp. 1–23.

"Approval Standards For Explosionproof Electrical Equipment General Requirements", Factory Mutual Research, Cl. No. 3615, Mar. 1989, pp. 1–34.

"Approval Standard Intrinsically Safe Apparatus and Associated Apparatus For Use In Class I, II, and III, Division I Hazardous (Classified) Locations", Factory Mutual Research, Cl. No. 3610, Oct. 1988, pp. 1–70.

"Automation On–Line" by, Phillips et al., Plant Services, Jul. 1997, pp. 41–45.

"Climb to New Heights by Controlling your PLCs Over the Internet" by, Phillips et al., Intech, Aug. 1998, pp. 50–51.

"CompProcessor For Piezoresistive Sensors" MCA Technologies Inc. (MCA7707), pp. 1–8.

"Ethernet emerges as viable, inexpensive fieldbus", Paul G. Schreier, Personal Engineering, Dec. 1997, p. 23–29.

"Ethernet Rules Closed–loop System" by, Eidson et al., Intech, Jun. 1998, pp. 39–42.

"Fieldbus Standard for Use in Industrial Control Systems Part 2: Physical Layer Specification and Service Definition", ISA–S50.02–1992, pp. 1–93.

"Fieldbus Standard for Use in Industrial Control Systems Part 3: Data Link Service Definition", ISA–S50.02–1997, Part 3, Aug. 1997, pp. 1–159.

Fieldbus Standard For Use in Industrial Control Systems Part 4: Data Link Protocol Specification, ISA–S50.02–1997, Part 4, Aug. 1997, pp. 1–148.

"Fieldbus Support For Process Analysis" by, Blevins et al., Fisher–Rosemount Systems, Inc., 1995, pp. 121–128.

"Fieldbus Technical Overview Understanding Foundation™ fieldbus technology", Fisher–Rosemount, 1998, pp. 1–23.

"Hypertext Transfer Protocol—HTTP/1.0" by, Berners–Lee et al., MIT/LCS, May 1996, pp. 1–54.

"Infranets, Intranets, and the Internet" by, Pradip Madan, Echelon Corp, Sensors, Mar. 1997, pp. 46–50.

"Internet Technology Adoption into Automation" by, Fondl et al., Automation Business, pp. 1–5.

"Internet Protocol Darpa Internet Program Protocol Specification" by, Information Sciences, Institute, University of Southern California, RFC 791, Sep. 1981, pp. 1–43.

"Introduction to Emit", emWare, Inc., 1997, pp. 1–22.

"Introduction to the Internet Protocols" by, Charles L. Hedrick, Computer Science Facilities Group, Rutgers University, Oct. 3, 1988, pp. 1–97.

"Is There A Future For Ethernet in Industrial Controlp48 ", Miclot et al., Plant Engineering, Oct. 1988, pp. 44–46, 48, 50.

LFM/SIMA Internet Remote Diagnostics Research Project Summary Report, Stanford University, Jan. 23, 1997, pp. 1–6.

"Managing Devices with the Web" by Howard et al., Byte, Sep. 1997, pp. 45–64.

"Modular Microkernel Links GUI And Browser For Embedded Web Devices" by, Tom Williams, pp. 1–2.

"PC Software Gets Its Edge From Windows, Components, and the Internet", Wayne Labs, I&CS, Mar. 1997, pp. 23–32.

Proceedings Sensor Expo, Aneheim, California, Produced by Expocon Management Associates, Inc., Apr. 1996, pp. 9–21.

Proceedings Sensor Expo, Boston, Massachuttes, Produced by Expocon Management Associates, Inc., May 1997, pp. 1–416.

"Smart Sensor Network of the Future" by, Jay Warrior, Sensors, Mar. 1997, pp. 40–45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1–78.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Comm. Statis.—Simula.*, 1995, pp. 409–437.

"A Knowledge–Based Approach for Detection and Diagnosis of Out–of–Control Events in Manufacturing Processes," by P. Love et al., *IEEE*, 1989, pp. 736–741.

"Advanced Engine Diagnostics Using Universal Process Modeling", by P. O'Sullivan, *Presented at the 1996 SAE Conference on Future Transportation Technology*, pp. 1–9.

"Programmable Hardware Architectures for Sensor Validation", by M.P. Henry et al., *Control Eng. Practice*, vol. 4, No. 10, pp. 1339–1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040–1047.

"Smart Temperature Measurement in the '90s", by T. Kerlin et al., *C&I*, (1990).

A Standard Interface for Self–Validating Sensors, by M.P. Henry et al., *Report No. QUEL 1884/91*, (1991).

"In Situ Calibration of Nuclear Plant Platinum Resistance Thermometers Using Johnson Noise Methods," *EPRI*, Jun. 1983.

"Johnson Noise Thermometer for High Radiation and High–Temperature Environments," by L. Oakes et al., *Fifth Symposium on Space Nuclear Power Systems*, Jan. 1988, pp. 2–23.

"Development of a Resistance Thermometer For Use Up to 1600°", by M.J. de Groot et al., *CAL LAB*, Jul./Aug. 1996, pp. 38–41.

"Survey, Applications, And Prospects of Johnson Noise Thermometry," by T. Blalock et al., *Electrical Engineering Department*, 1981 pp. 2–11.

"Noise Thermometry for Industrial and Metrological Applications at KFA Julich," by H. Brixby et al., *7th International Symposium on Temperature*, 1992.

"Johnson Noise Power Thermometer and its Application in Process Temperature Measurement," by T.V. Blalock et al., *American Institute of Physics* 1982, pp. 1249–1259.

"Tuned–Circuit Dual–Mode Johnson Noise Thermometers," by R.L. Shepard et al., Apr. 1992.

"Tuned–Circuit Johnson Noise Thermometry," by Michael Roberts et al., *7th Symposium on Space Nuclear Power Systems*, Jan. 1990.

"Development of a Long–Life, High–Reliability Remotely Operated Johnson Noise Thermometer," by R.L. Shepard et al., *ISA*, 1991, pp. 77–84.

"Application of Johnson Noise Thermmetry to Space Nuclear Reactors," by M.J. Roberts et al., *Presented at the 6th Symposium on Space Nuclear Power Systems*, Jan. 9–12, 1989.

"A Decade of Progress in High Temperature Johnson Noise Thermometry," by T.V. Blalock et al., *American Institute of Physics*, 1982 pp. 1219–1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29–Aug. 1, 1996, pp. 50–51—50–56.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310–1314.

"Detecting Blockage in Process Connections of Differential Pressure Transmitters", by E. Taya et al., *SICE*, 1995, pp. 1605–1608.

"A Fault–Tolerant Interface for Self–Validating Sensors", by M.P. Henry, *Colloquium*, pp. 3/1–3/2 (Nov. 1990).

"Fuzzy Logic and Neural Network Applications to Fault Diagnosis", by P. Frank et al., *Internation Journal of Approximate Reasoning*, (1997), pp. 68–88.

"Keynote Paper: Hardware Compilation–A New Technique for Rapid Prototyping of Digital Systems–Applied to Sensor Validation", by M.P. Henry, *Control Eng. Practice*, vol. 3, No. 7., pp. 907–924, (1995).

"The Implications of Digital Communications on Sensor Validation", by M. Henry et al., *Report No. QUEL 1912/92*, (1992).

"In–Situ Response Time Testing of Thermocouples", *ISA*, by H.M. Hashemian et al., Paper No. 89–0056, pp. 587–593, (1989).

"An Integrated Architecture For Signal Validation in Power Plants," by B.R. Upadhyaya et al., *Third IEEE International Symposium on Intelligent Control*, Aug. 24–26, 1988, pp. 1–6.

"Integration of Multiple Signal Validation Modules for Sensor Monitoring," by B. Upadhyaya et al., *Department of Nuclear Engineering*, Jul. 8, 1990, pp. 1–6.

"Intelligent Behaviour for Self–Validating Sensors", by M.P. Henry, *Advances In Measurement*, pp. 1–7, (May 1990).

"Measurement of the Temperature Fluctuation in a Resistor Generating 1/F Fluctuation," by S. Hashiguchi, *Japanese Journal of Applied PHysics*, vol. 22, No. 5, Part 2, May 1983, pp. L284–L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244–246.

"Neural Networks for Sensor Validation and Plant Monitoring," by B. Upadhyaya, *International Fast Reactor Safety Meeting*, Aug. 12–16, 1990, pp. 2–10.

"Neural Networks for Sensor Validation and Plantwide Monitoring," by E. Eryurek, 1992.

"A Method of Johnson Noise Thermometry", by C.J. Borkowski et al., *Rev. Sci. Instrum.*, vol. 45, No. 2, (Feb. 1974) pp. 151–162.

"Thermocouple Continuity Checker," IBM Technical Disclosure Bulletin, vol. 20, No. 5, p. 1954 (Oct. 1977).

"A Self–Validatin Thermocouple," Janice C–Y et al., IEEE Transactions on Control Systems Technology, vol. 5, No. 2, pp. 239–253 (Mar. 1997).

*Instrument Engineers' Handbook*, Chapter IV entitled "Temperature Measurement," by T.J. Claggett, pp. 266–333 (1982).

"emWare's Release EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1–14, Rosemount Inc. (1997).

Warrior, J., "The Collision Between the Web and Plant Floor Automation," $6^{Th}$. WWW Conference Workshop on Embedded Web Technology, Santa Clara, CA (Apr. 7, 1997).

Microsoft Press Computer Dictionary, $3^{rd}$ Edtion, p. 124.

"Internaal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1–58 and 169–204.

"Time–Frequency Analysis of Transient Pressure Signals for a Mechanical Heart Valve Cavitation Study," *ASAIO Journal*, by Alex A. Yu et al., vol. 44, No. 5, pp. M475–M479, (Sep.–Oct. 1998).

"Transient Pressure Signals in Mechanical Heart Valve Caviation," by Z.J. Wu et al., pp. M555–M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED–vol. 28, pp. 297–298 (Nov. 6–11, 1994).

"Monitoring and Diagnosis of Cavitation in Pumps and Valves Using the Wigner Distribution," *Hydroaccoustic Facilities, Instrumentation, and Experimental Techniques*, NCA–vol. 10, pp. 31–36, (1991).

"Developing Predictive Models for Cavitation Erosion," *Codes and Standards in A Global Environment*, PVP–vol. 259, pp. 189–192 (1993).

"Self–Diagnosing Intelligent Motors: A Key Enabler for Next Generation Manufacturing System," by Fred M. Discenzo et al., pp. 3/1–3/4 (1999).

"A Microcomputer–Based Instrument for Applications in Platinum Resistance Thermometry," by H. Rosemary Taylor and Hector A. Navarro, Journal of Physics E. Scientific Instrument, vol. 16, No. 11, pp. 1100–1104 (1983).

"Experience in Using Estelle for the Specification and Verification of a Fieldbus Protocol: FIP," by Barretto et al., Computer Networking, pp. 295–304 (1990).

"Computer Simulation of H1 Field Bus Transmission," by Utsumi et al., Advances in Instrumentation and Control, vol. 46, Part 2, pp. 1815–1827 (1991).

"Progress in Fieldbus Developments for Measuring and Control Application," by A. Schwaier, Sensor and Acuators, pp. 115–119 (1991).

"Ein Emulationssystem zur Leistungsanalyse von Feldbussystemen, Teil 1," by R. Hoyer, pp. 335–336 (1991).

"Simulatore Integrato: Controllo su bus di campo," by Barabino et al., Automazione e Strumentazione, pp. 85–91 (Oct. 1993).

"Ein Modulares, verteiltes Diagnose–Expertensystem für die Fehlerdiagnose in lokalen Netzen," by Jürgen M. Schröder, pp. 557–565 (1990).

"Fault Diagnosis of Fieldbus Systems," by Jürgen Quade, pp. 577–581 (10/92).

"Ziels und Anwendungen von Feldbussystemen," by T. Pfiefer et al., pp. 549–557 (10/87).

"PROFIBUS–Infrastrukturmaβnahem," by Tilo Pfeifer et al., pp. 416–419 (8/91).

"Simulatin des Zeitverhaltens von Feldbussystemen," by O. Schnelle, pp. 440–442 (1991).

"Modélisation et stimulation d'un bus de terrain: FIP," by Song et al, pp. 5–9 (undated).

"Feldbusnetz für Automatisierungssysteme mit intelligenten Funktionseinheiten," by W. Kriesel et al., pqp. 486–489 (1987).

"Bus de campo para la inteconexión del proceso con sistemas digitales de control," Tecnologie, pp. 141–147 (1990).

"Dezentrale Installation mit Echtzeit–Feldbus," Netzwerks, Jq. Nr.3 v. 14.3, 4 pages (1990).

"Process Measurement and Analysis," by Liptak et al., Instrument Engineers' Handbook, Third Edition, pp. 528–530, (1995).

Journal of Intelligent Manufacturing (1997) 8, 271–276 article entitled "On–line tool condition monitoring system with wavelet fuzzy neural network".

"Notification of Transmittal of the International Search Report or the Declaration" PCT/US01/40782.

"Notification of Transmittal of the International Search Report or the Declaration " PCT/US01/40791.

IEEE Transactions on Magnetics, vol. 34, No. 5, Sep. 1998, "Optimal Design of the Coils of an Electromagnetic Flow Meter," pp. 2563–2566.

IEEE Transactions on Magnetics, vol. 30, No. 2, Mar. 1994, "Magnetic Fluid Flow Meter for Gases," pp. 936–938.

IEEE Instrumentation and Measurement Technology Conference, May 18–21, 1998, "New approach to a main error estimation for primary transducer of electromagnetic flow meter," pp. 1093–1097.

School of Engineering and Applied Sciences, by J.E. Amadi–Echendu and E. H. Higham, "Additional Information from Flowmeters via Signal Analysis," pp. 187–193.

* cited by examiner

HIGH ACCURACY SIGNAL PROCESSING FOR MAGNETIC FLOWMETER

BACKGROUND OF THE INVENTION

The present invention relates to magnetic flowmeters. More specifically, the present invention relates to signal processing in a magnetic flowmeter.

Magnetic flowmeters measure the volumetric flow rate of a conductive fluid by determining the velocity of the fluid passing through a magnetic field. Magnetic flowmeter systems typically include a flow tube assembly and a transmitter assembly. The flow tube assembly is installed in a process piping line and includes a pair of conductance coils and a pair of electrodes. The coils are located on opposite sides of the cross section of the pipe and are energized by drive current from the transmitter. The drive current cause a magnetic field to be developed along a cross section of the pipe. The two electrodes are located across the pipe from each other along a line which is perpendicular the magnetic field. Fluid passing through the pipe is electrically conductive and the movement of the fluid through the magnetic field results in electrical potential or electromotive force (EMF) to be induced in the fluid which can be detected by the electrodes. This is in accordance with Faraday's law of electromagnetic induction and the magnitude of the electric potential is proportional to the velocity of fluid.

The magnitude of the electric potential between the two electrodes is relatively small, particularly when measuring fluid having low conductivity. Noise in the electric potential can lead to inaccuracies in flow measurements. Various types of noise which can be present in the measurement signal include spikes, 1/f noise and white noise. Prior art techniques to eliminate noise includes the use of filters to provide a long damping time. However, although this improves measurement accuracy, it reduces the response time of the flowmeter. A method of improving the accuracy of magnetic flowmeters would be a significant improvement in the art, particularly if the method did not significantly lengthen the response time of the flowmeter.

SUMMARY OF THE INVENTION

A magnetic flowmeter includes a wavelet transformer for measuring flow which provides accurate flow measurement and a short response time. The flowmeter includes a flow tube assembly adapted to receive a fluid flow, a coil configured to apply a magnetic field to the fluid in the flow tube, and an EMF sensor having an EMF output related to an EMF generated in the fluid flow due to the applied magnetic field, velocity of the fluid and signal noise. A signal processor includes the wavelet transformer and is disposed to perform a wavelet transformation on the EMF output and provide a decomposition signal related to velocity of the fluid.

DETAILED DESCRIPTION OF AN ILLUSTRATIVE EMBODIMENT

Figure 1:
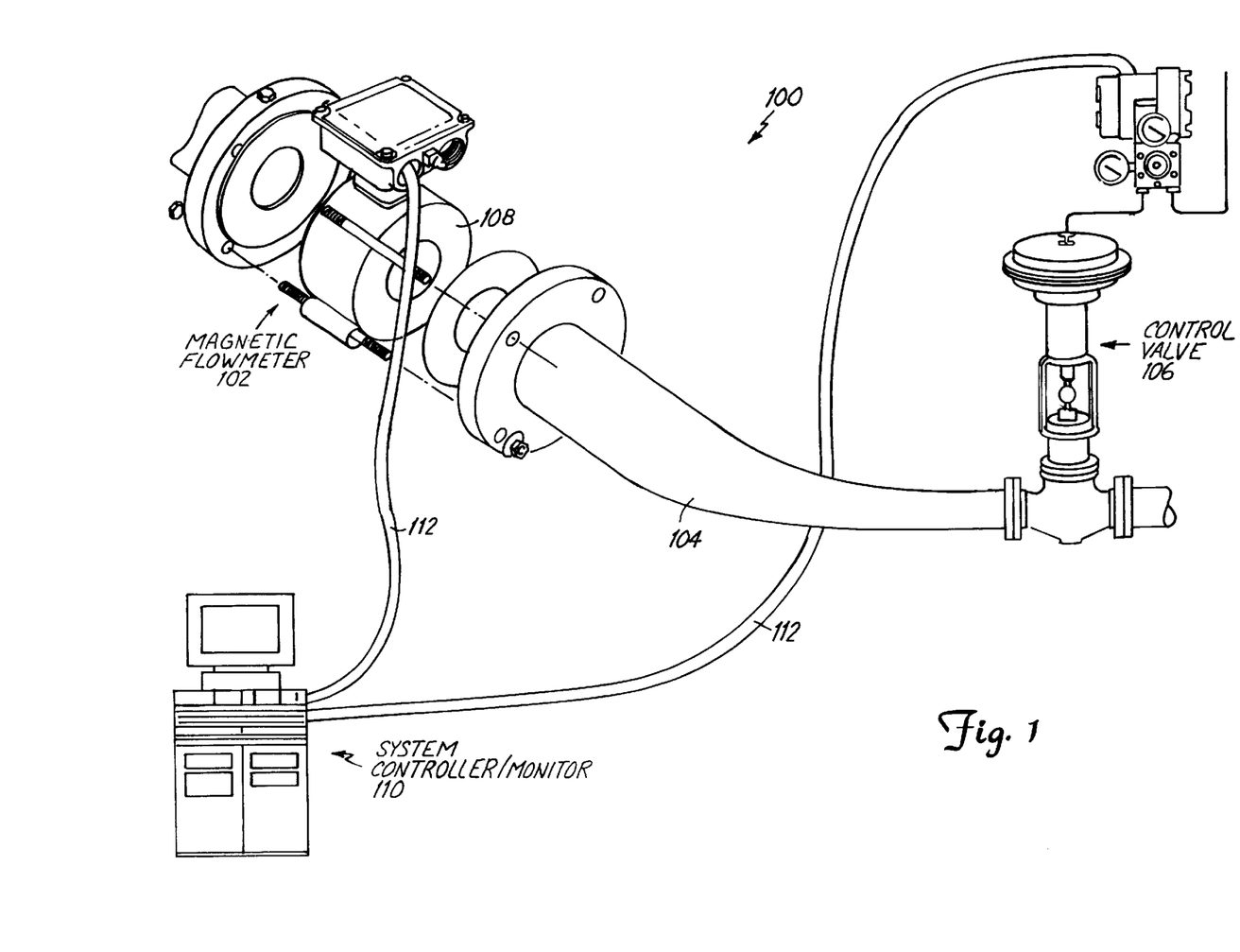
FIG. 1 is an illustration of a typical fluid processing environment for the magnetic flowmeter.

In FIG. 1, a typical environment for magnetic flowmeter 102 is illustrated at 100. In FIG. 1, magnetic flowmeter 102 is shown coupled to process piping 104 which also couples to control valve 106. Magnetic flowmeter 102 is an example of one type of process variable transmitter which can be configured to monitor one or more process variables associated with fluids in a process plant such as slurries, liquids, vapors and gases in chemical, pulp, petroleum, gas, pharmaceutical, food and other fluid processing plants. In a magnetic flowmeter, the monitored process variable relates to velocity of process fluid through flow tube 108. Magnetic flowmeter 102 outputs are configured for transmission over long distances to a controller or indicator via communication bus 112. In typical processing plants, communication bus 112 can be a 4–20 mA current loop, a fieldbus connection, a HART protocol communication ethernet or a fiberoptic connection to a controller such as system controller/monitor 110. System controller 110 is programmed as a process monitor, to display flow information for a human operator, or as a process controller to control the process using control valve 106 over communication bus 112.

Figure 2:
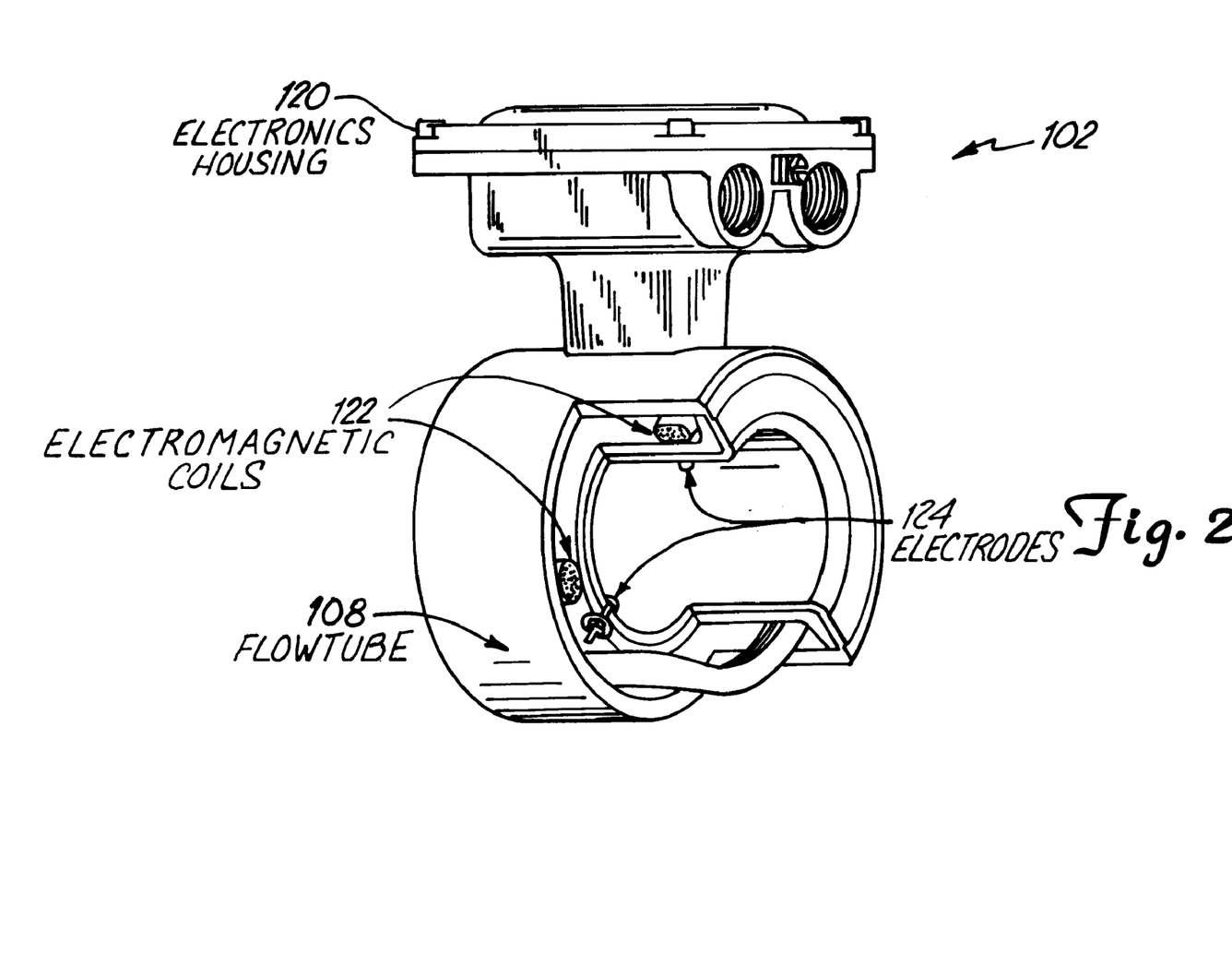
FIG. 2 is a cutaway perspective view of the magnetic flow meter.

In FIG. 2, a perspective cutaway view of magnetic flowmeter 102 is shown generally. Flowmeter 102 includes electronics housing 120 connected to flow tube 108. Flow tube 108 includes electromagnetic coils 122 which are used to induce a magnetic field in fluid flowing through flow tube 108. The electrodes 124 in flow tube 108 provide an EMF sensor which senses the EMF generated in the fluid due to the velocity of the flow and the applied magnetic field and are also sensitive to noise. Coil driver circuitry 130 (FIG. 3) in electronic housing 120 provides a drive signal to electromagnetic coils 122 and electrodes 124 provide EMF output 134 to EMF signal amplifier 132 shown in FIG. 3.

Figure 3:
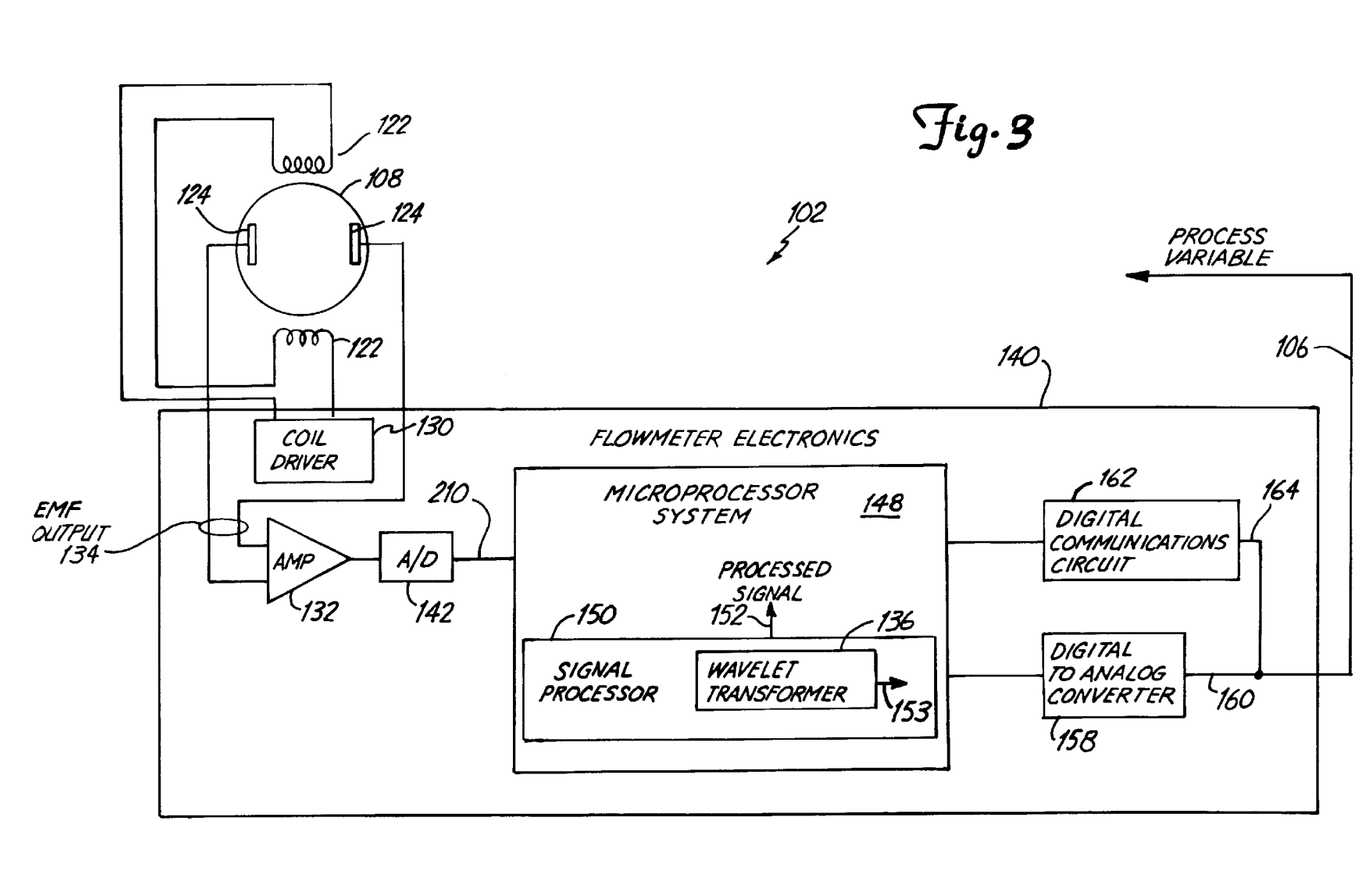
FIG. 3 is a block diagram of a magnetic fluid flowmeter including a wavelet transformer.

In FIG. 3, a block diagram shows one embodiment of magnetic flowmeter 102 for measuring a flow of a conductive process fluid through flow tube assembly 108. Coils 122 are configured to apply an external magnetic field in the fluid flow in response to an applied drive current. EMF sensors (electrodes) 124 electrically couple to the fluid flow and provide an EMF signal output 134 related to an EMF generated in the fluid flow due to the applied magnetic field, fluid velocity, and noise. A signal processor 150 in flow meter electronics 140 couples to the EMF output 134 and includes a wavelet transformer 136 which provides an isolated signal output 153 related to fluid velocity. Signal processor 150 is shown in one embodiment in FIG. 4 including spike remover 200, change follower 202, amplitude velocity converter 204 and median filter 206. Converter 204 can include a neural network 250 shown in FIG. 10. Flowmeter electronics 140 senses velocity of process fluid using isolated signal output 153 which is converted into a digital format by analog to digital converter 142. Analog to digital converter 142 provides a digitized EMF signal to microprocessor system 148.

Microprocessor system 148 includes signal processor 150 which performs the wavelet transformation on the digitized EMF signal using wavelet transformer 136 and provides processed signal output 152. Operation of wavelet transformer 136 is set forth below in the description of FIG. 11. Microprocessor system 148 calculates velocity through flow tube 108 in accordance with a relationship between the EMF output 134 and velocity as set forth in Faraday's law, which states:

$$V = \frac{E}{kBD} \qquad \text{Eq. 1}$$

where E is the isolated signal output 153 which is related to the EMF output 134, V is the velocity of the fluid, D is the diameter of flow tube 108 and B is the strength of the magnetic field in the fluid. k is a constant of proportionality. Microprocessor system 148 uses velocity to calculate flow of the process fluid in accordance with known techniques. A digital to analog converter 158 coupled to microprocessor system 148 generates an analog transmitter output 160 for coupling to communication bus 106. A digital communication circuit 162 communicate generates a flowmeter output 164. The analog output 160 and the digital output 164 can be coupled to process controllers or monitors as desired.

Figure 4:
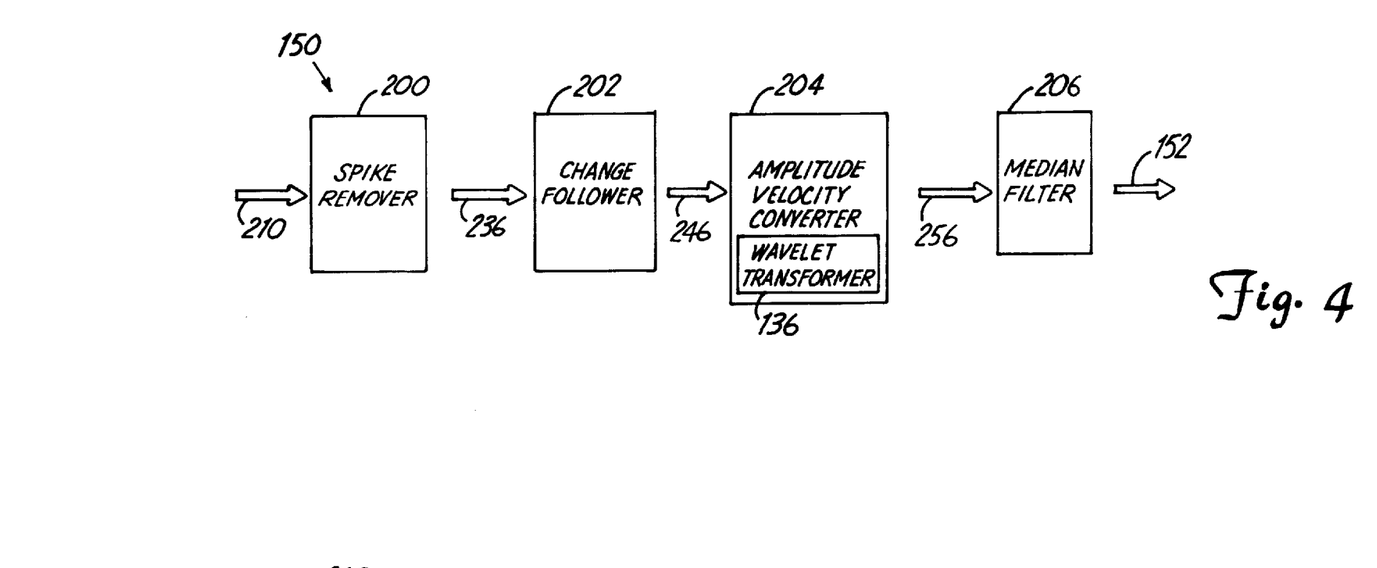
FIG. 4 is a block diagram of a signal processor of the magnetic flowmeter.

The wavelet transformer 136 isolates the velocity related signals from the noise in the EMF signal 134 to thereby allow more accurate fluid velocity measurement. FIG. 4 shows another embodiment of signal processor 150 which includes a spike remover 200, a change follower 202, an amplitude to velocity convertor 204 and a median filter 206. Wavelet transformer 136 is one component of amplitude to velocity convertor 204 as explained below. EMF signal 134 includes three major types of noise: signal spikes, 1/f noise and white noise. The four processing stages 200–206 shown in FIG. 4 operate together to significantly reduce errors associated with these three noise sources.

Signal processor 150 includes wavelet transformer 136 along with some or all of the other elements illustrated in FIGS. 4, 5, 9 and 10. The additional components require additional signal processing from microprocessing system 148, however, they provide improved accuracy in noisy environments.

Figure 5:
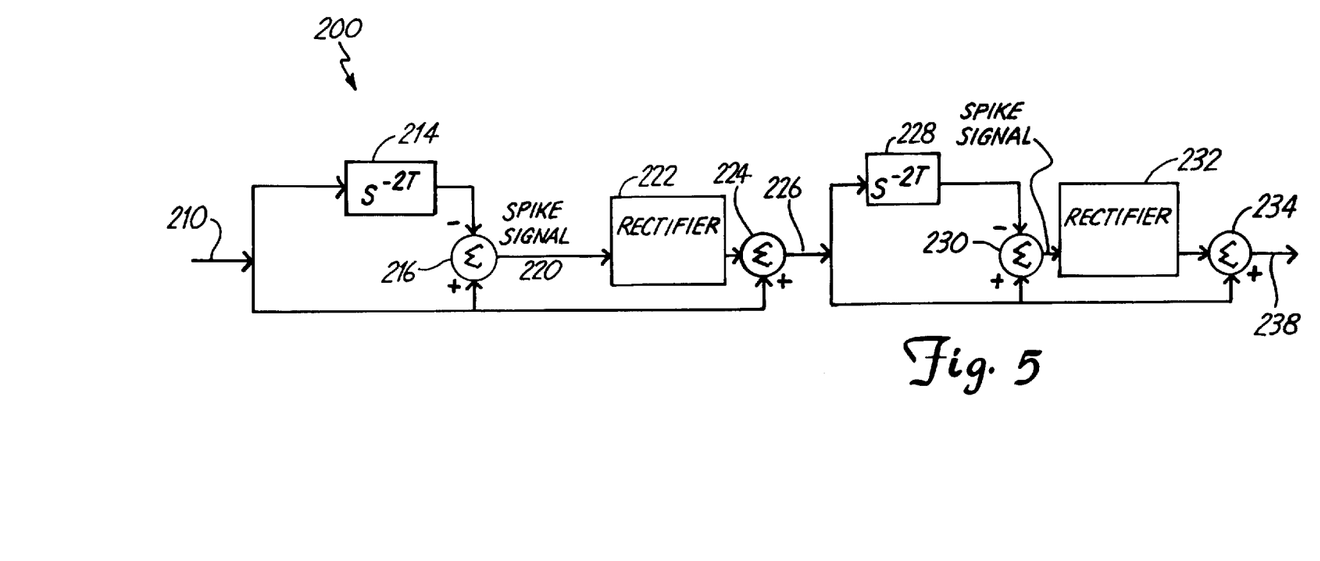
FIG. 5 is a block diagram of a spike remover.
Figure 6:
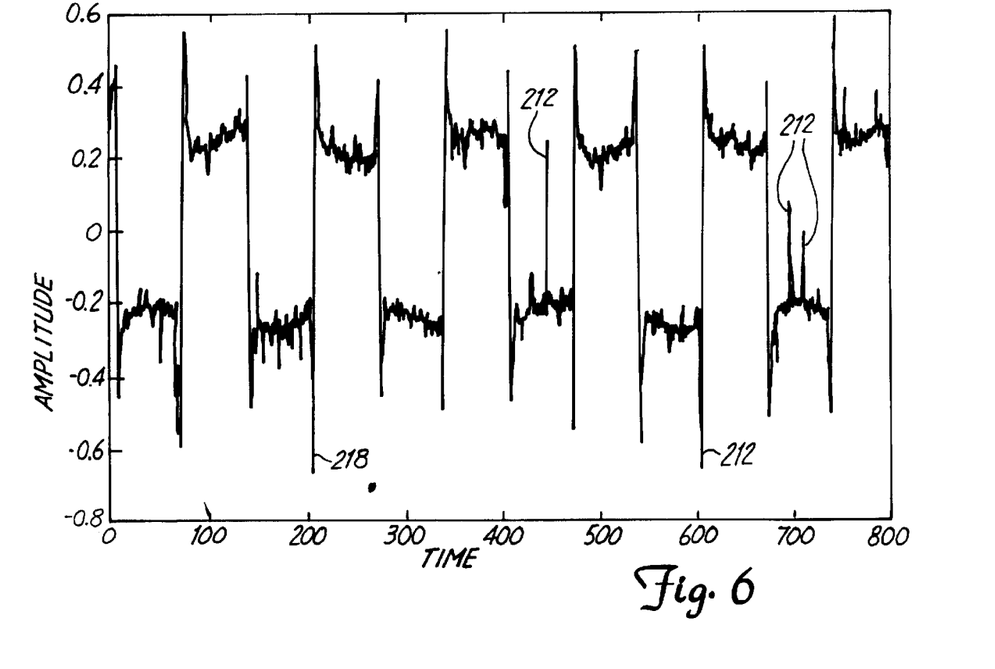
FIG. 6 is a graph of amplitude versus time showing spikes in an EMF signal.
Figure 7:
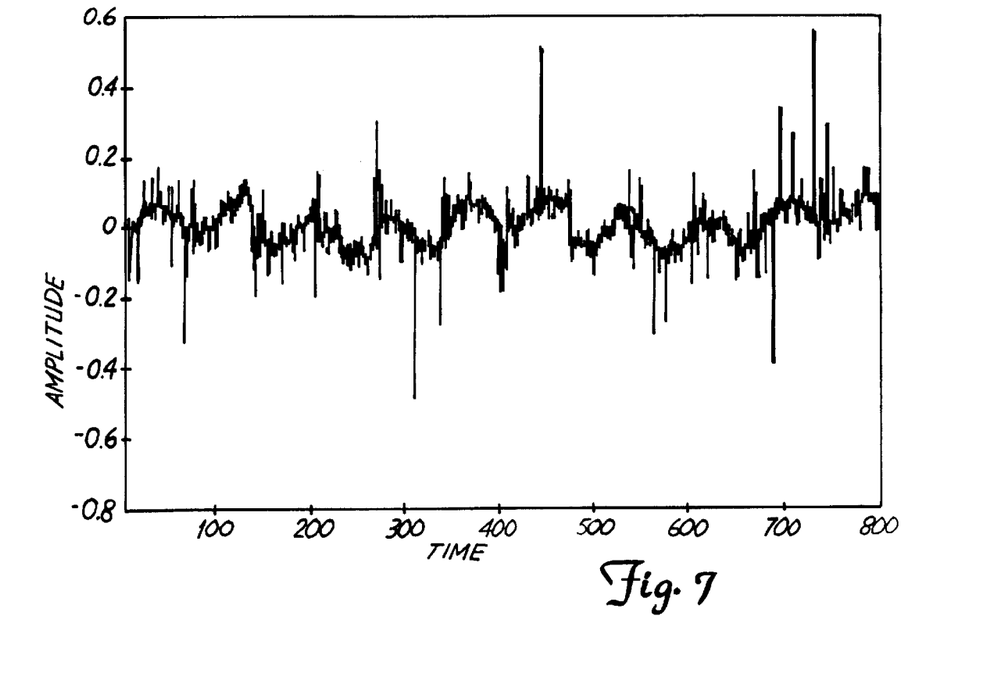
FIG. 7 is a graph of amplitude versus time showing a spike signal in FIG. 5.
Figure 8:
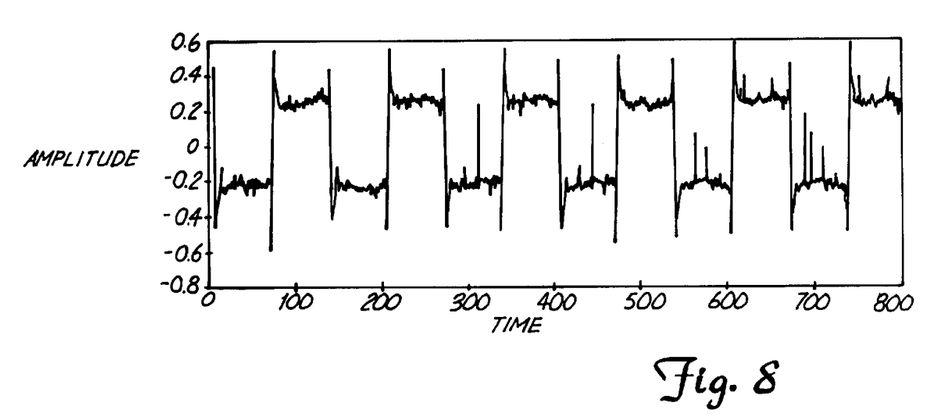
FIG. 8 is a graph of amplitude versus time showing an EMF signal in which negative spikes have been removed.

Spike noise appears in EMF signal 134 as large peaks and can be caused, for example, by the impact of solids against electrodes 124. The amplitude of such a spike can be substantially larger than the flow signal. One potential technique for removing spikes is through the use of an averaging window. However, due to the relatively large value of a spike, the averaging window can introduce a significant error. In general, spikes occur relatively infrequently in the EMF signal, the occurrences of spikes are localized and the flow velocity does not change rapidly over a short time period. FIG. 5 is a more detailed block diagram of spike remover 200. Spike remover 200 receives digitized EMF signal 210 which is illustrated graphically in FIG. 6 in a graph of normalized amplitude versus time which shows spikes 212. Spike removing 200 includes a period delay 214 which shifts the signal 210 by one period. Summer 216 subtracts the time shifted signal from the unshifted EMF signal 210 to generate a spike signal output 220 which is illustrated graphically in FIG. 7. Rectifier 222 removes the positive spikes from signal 220 and the resulting negative spike signal is subtracted from the EMF signal 210 by summer 224. This subtraction yields a partially process signal 226 which is shown graphically in FIG. 8 in which negative spikes have been removed. This process is repeated for positive spikes using period delay 228, summer 230, rectifier 232 and summer 234 which provides a spikeless output signal 236. Rectifier 232 removes the negative spikes in contrast to block 222 which removes the positive spikes.

Figure 9:
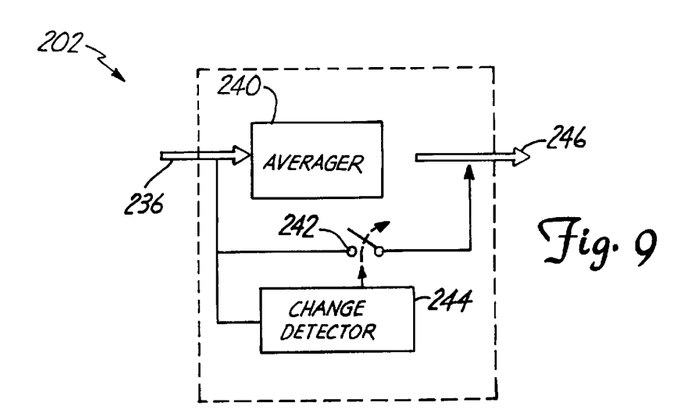
FIG. 9 is a block diagram of a change follower of FIG. 4.

Change follower 202 illustrated in FIG. 9 operates as switch which controls the width of an averaging window according to changes in signal 236. Change follower 202 includes a signal averager 240 and a bypass switch 242 operated by a change detector 244. During normal operation, averager 240 maintains an averaging window having a width selected to remove 1/f noise and white noise in signal 236. However, due to the nature of averaging, averager output signal 246 responds slowly to rapid changes in signal 236. The response time is improved by dynamically adjusting the width of the averaging window in response to the magnitude of changes in signal 236. Bypass switch 242 bypasses averager 240 when change detector 244 detects a rapid change in the input signal 236. This causes output 246 to reflect a rapid change in the input 236. One example change detector 244 is a slope detector which actuates switch 242 as a function of the derivative of signal 236.

Figure 10:
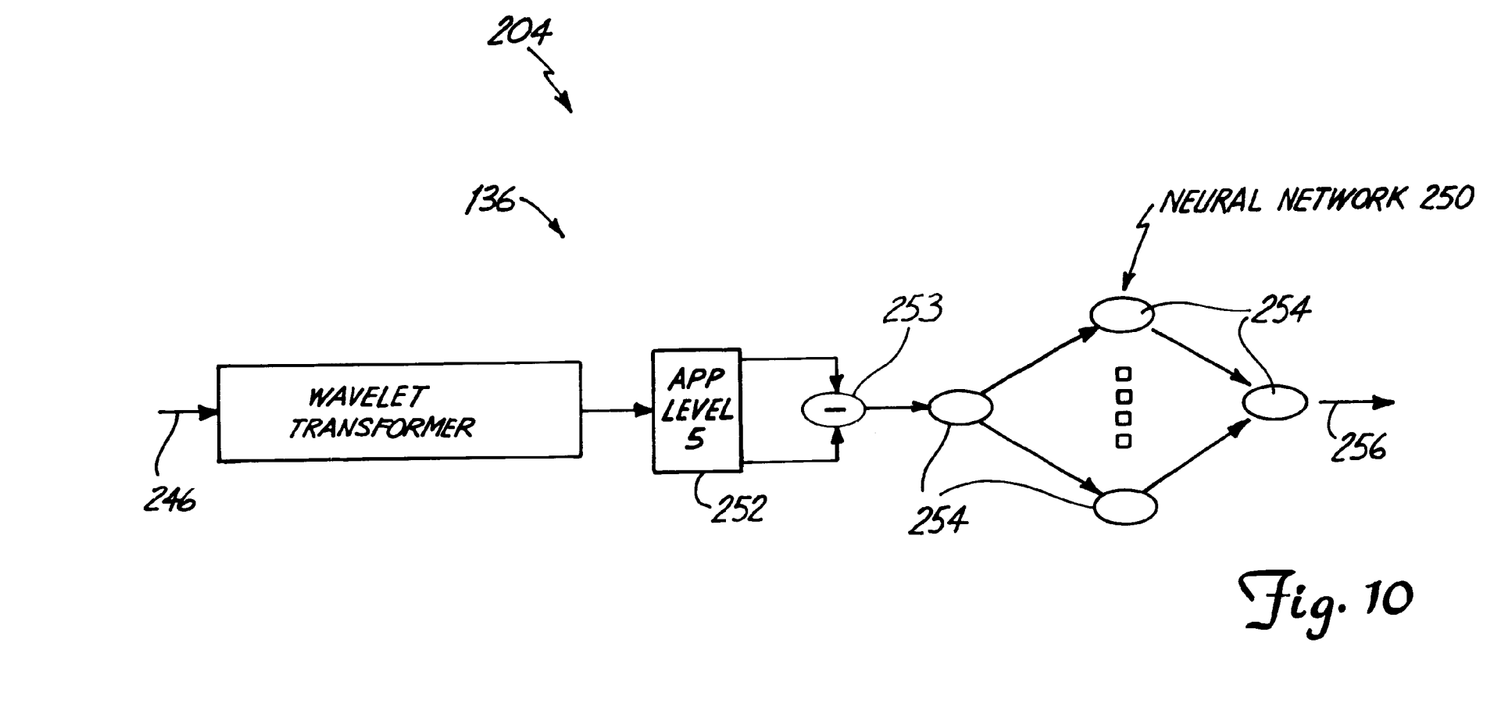
FIG. 10 is a block diagram of an amplitude velocity convertor of FIG. 4.

Amplitude velocity convertor 204 illustrated in FIG. 10 includes wavelet transformer 136 and neural network 250. Ideally, EMF signal 134 is a square wave having an amplitude which is proportional to fluid velocity. However, the noise which contaminates signal 134 produces errors in the signal amplitude. The wavelet transformer 136 isolates signal components in signal 246 which are provided to neural network 250. Wavelet analysis is a technique for transforming a time domain signal into the frequency domain which, like a Fourier transformation, allows the frequency components to be identified. However, unlike a Fourier transformation, in a wavelet transformation the output includes information related to time. This can be expressed in the form of a three dimensional graph with time shown on one axis, frequency on a second axis and signal amplitude on a third axis. A discussion of wavelet analysis is given in *On-Line Tool Condition Monitoring System With Wavelet Fuzzy Neural Network*, by L. Xiaoli et al., 8 JOURNAL OF INTELLIGENT MANUFACTURING pgs. 271–276 (1997). In performing a continuous wavelet transformation, a portion of the signal is windowed and convolved with a wavelet function. This convolution is performed by superimposing the wavelet function at the beginning of a sample, multiplying the wavelet function with the signal and then integrating the result over the sample period. The result of the integration is scaled and provides the first value for continuous wavelet transform at time equals zero. This point can be then mapped onto a three dimensional plane. The wavelet function is then shifted right (forward in time) and the multiplication and integration steps are repeated to obtain another set of data points which are mapped onto the 3-D space. This process is repeated and the wavelet is moved (convolved) through the entire signal. The wavelet function is then scaled, which changes the frequency resolution of the transformation, and the above steps are repeated. This data can be visualized as a three dimensional graph of time, frequency and amplitude.

Figure 11:
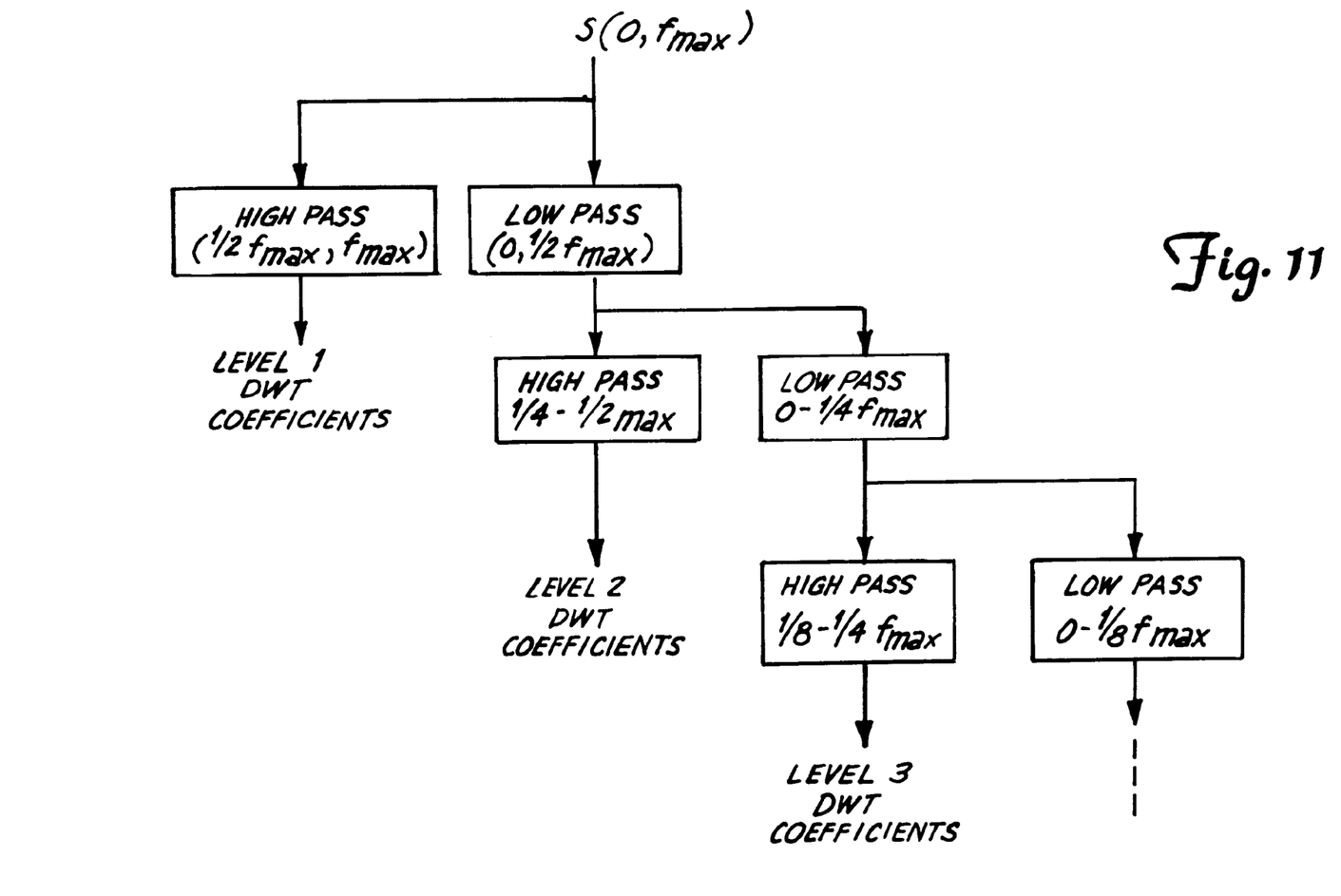
FIG. 11 is a block diagram of a sub band coder used in the wavelet transformer of the magnetic flowmeter.

The continuous wavelet transformation described above requires extensive computations. Therefore, in one embodiment, wavelet transformer 136 performs a discrete wavelet transform (DWT) which is well suited for implementation in microprocessor system 148. One efficient discrete wavelet transform uses the Mallat algorithm which is a two channel sub-band coder. The Mallet algorithm provides a series of separated or decomposed signals which are representative of individual frequency components of the original signal. FIG. 11 shows an example of such a system in which an original sensor signal S is decomposed using a sub-band coder of a Mallet algorithm. The signal S has a frequency range from 0 to a maximum of $f_{max}$. The signal is passed simultaneously through a first high pass filter having a frequency range from ½ $f_{max}$ to $f_{max}$, and a low pass filter having a frequency range from 0 to ½ $f_{max}$. This process is called decomposition. The output from the high pass filter provides "level 1" discrete wavelet transform coefficients. The level 1 coefficients represent the amplitude as a function of time of that portion of the input signal which is between ½ $f_{max}$ and $f_{max}$. The output from the 0–½ $f_{max}$ low pass filter is passed through subsequent high pass (¼ $f_{max}$–½ $f_{max}$) and low pass (0–¼ $f_{max}$) filters, as desired, to provide additional levels (beyond "level 1") of discrete wavelet transform coefficients. The outputs from each low pass filter can be subjected to further decompositions offering additional levels of discrete wavelet transformation coefficients as desired. In general, the outputs from the high pass filters are referred to as detail outputs while the outputs from the low pass filters are referred to as approximation outputs. This process continues until the desired resolution is achieved or the number of remaining data samples after a decomposition yields no additional information. The resolution of the wavelet transform is chosen to be approximately the same as the sensor or the same as the minimum signal resolution required to monitor the EMF signal 134. Each level of DWT coefficients is representative of signal amplitude as a function of time for a given frequency range. In one embodiment, cutoff frequencies for the filters are approximately 62.5 Hz, 125 Hz, 250 Hz, 500 Hz and 1000 Hz.

In some embodiments, padding is added to the signal by adding data to the sensor signal near the borders of windows used in the wavelet analysis. This padding reduces distortions in the frequency domain output. This technique can be used with a continuous wavelet transform or a discrete wavelet transform. "Padding" is defined as appending extra data on either side of the current active data window, for example, extra data points are added which extend 25% of the current window beyond either window edge. In one embodiment, the padding is generated by repeating a portion of the data in the current window so that the added data "pads" the existing signal on either side. The entire data set is then fit to a quadratic equation which is used to extrapolate the signal 25% beyond the active data window.

In one preferred embodiment, the level five approximation signal 252 is provided as an input to neural network 250 through summing node 253. However, other approximation or detail signals, or the combinations, can be used in more complex systems. Neural network 250 includes a series of neurons 254 which are interconnected and include neuron functions in accordance with known techniques. Each neuron 254 provides an output in response to inputs to the neuron 254 based upon the function of the particular neuron. The output from each neuron is passed to subsequent neurons until the neural network output signal 256 is provided as an output. If neural network is trained to provide a flow rate signal, output signal 256 indicates the flow rate of process fluid in flow tube 108. When trained in this manner, the neural network 250 implements equation 1 and provides reduced sensitivity to noise without decreasing response time. Training can be through the known back-propogation algorithm. In the simplest case, where only a single neuron is used, it can be represented by a linear function. However, any number of neurons or training techniques can be used.

Other types of neural networks can be used including single neural networks, fuzzy-neural networks or more complex neural-wavelet networks.

Median filter 206 removes impulses in velocity signal 256 without changing the shape of edges in signal 256. The median filter 206 is helpful in reducing any residual spikes in the signal. Median filter 206 can be implemented using digital signal processing techniques and its characteristics should be configured for the particular fluid, flow characteristics of flowmeter 102.

Figure 12:
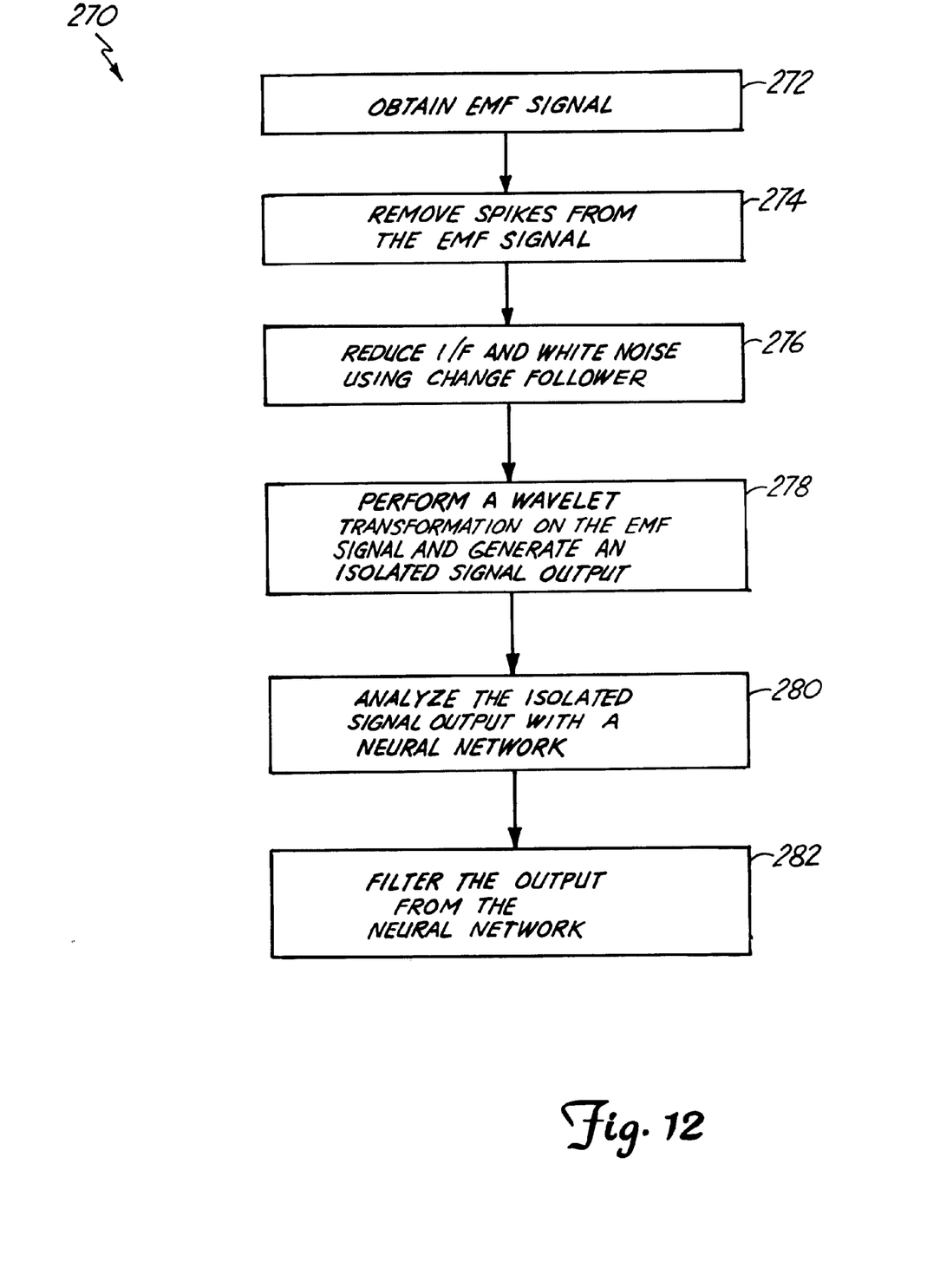
FIG. 12 is a simplified flow chart of a magnetic flowmeter measuring flow of a process fluid.

In FIG. 12, a flow chart 270 of a method of measuring flow velocity in a magnetic flowmeter is shown. The EMF output signal 134 is obtained at 272. The obtained signal can be amplified by amplifier 132 and digitized by analog to digital converter 142. Spikes are removed from the EMF signal at 274 using spike remover 200 and 1/f white noise are removed using change follower 202 at 276. The filtered signal is wavelet transformed at 278 to generate an isolated signal output 252. The isolated signal is analyzed by neural network 250 at 280 and the output from the neural network 250 is filtered using median filter 206 at 282. The various filters and signal processing techniques shown in FIG. 4 and performed in accordance with flow chart 270 of FIG. 12 are preferably implemented using digital signal processing techniques in microprocessor system 148.

Although the invention has been described with reference to preferred embodiments, workers skilled in the art will recognize that changes can be made in form and detail without departing from the spirit and scope of the invention. For example, various function blocks of the invention have been described in terms of circuitry, however, many function blocks can be implemented in other forms such as digital and analog circuits, software and their hybrids. When implemented in software, a microprocessor performs the functions and the signals comprise digital values on which the software operates. A general purpose processor programmed with instructions that cause the processor to perform the desired process elements, application specific hardware components that contain circuit wired to perform the desired elements and any combination of programming a general purpose processor and hardware components can be used. Deterministic or fuzzy logic techniques can be used as needed to make decisions in the circuitry or software. Because of the nature of complex digital circuitry, circuit elements may not be partitioned into separate blocks as shown, but components used for various functional blocks can be intermingled and shared. Likewise with software, some instructions can be shared as part of several functions and be intermingled with unrelated instructions within the scope of the invention. Other sub-bands of the wavelet transformer can be used and some sub-bands can provide information, such as diagnostic information related to the magnetic flowmeter or the process. Other information provided includes information related to chemical reactions, process changes, chemical composition changes and process control.

What is claimed is:

1. A magnetic flowmeter providing high accuracy signal processing for measuring flow of a conductive process fluid, comprising:

a flow tube assembly disposed to receive a fluid flow;

a coil configured to apply a magnetic field to the fluid flow;

an electromotive force (EMF) sensor coupled to the fluid flow having an EMF signal output related to an EMF generated in the fluid flow due to the applied magnetic field, velocity of the fluid and noise;

an isolated signal output related to the velocity of the fluid; and a signal processor coupled to the EMF signal output, the signal processor including a wavelet transformer and providing the isolated signal output.

2. The magnetic flowmeter of claim 1 wherein the signal processor includes a neural network coupled to the isolated signal output having at least one neuron.

3. The magnetic flowmeter of claim 2 wherein the output from the neural network is related to fluid velocity.

4. The magnetic flowmeter of claim 2 wherein the output from the neural network is related to fluid flow.

5. The magnetic flowmeter of claim 4 wherein the neural network and the wavelet transformer are connected to form a neural/wavelet network.

6. The magnetic flowmeter of claim 2 wherein the signal processor includes a median filter configured to filter spikes in the output from the neural network.

7. The magnetic flowmeter of claim 1 wherein the signal processor includes a spike remover configured to remove spikes from the EMF signal output.

8. A magnetic flowmeter providing high accuracy signal processing for measuring flow of a conductive process fluid, comprising:

a flow tube assembly disposed to receive a fluid flow;

a coil configured to apply a magnetic field to the fluid flow;

an electromotive force (EMF) sensor coupled to the fluid flow having an EMF signal output related to an EMF generated in the fluid flow due to the applied magnetic field, velocity of the fluid and noise; and a signal processor coupled to the EMF signal output and including a wavelet transformer, an isolated signal output related to velocity of the fluid and a spike remover configured to remove spikes from the EMF signal output, the spike remover including a delay to delay the EMF signal by one period and a summer to sum the delayed EMF signal with the EMF signal to thereby generate a spike signal.

9. The magnetic flowmeter of claim 8 including a rectifier to remove a polarity of spikes in the spike signal.

10. The magnetic flowmeter of claim 1 wherein the signal processor includes a change follower coupled to the EMF signal output.

11. The magnetic flowmeter of claim 10 wherein the change follower includes an averager.

12. A magnetic flowmeter providing high accuracy signal processing for measuring flow of a conductive process fluid, comprising:

a flow tube assembly disposed to receive a fluid flow;

a coil configured to apply a magnetic field to the fluid flow;

an electromotive force (EMF) sensor coupled to the fluid flow having an EMF signal output related to an EMF generated in the fluid flow due to the applied magnetic field, velocity of the fluid and noise; and a signal processor coupled to the EMF signal output and including a wavelet transformer and an isolated signal output related to the velocity of the fluid and a change follower coupled to the EMF signal output, the change follower including an averager and a bypass switch configured to bypass the change follower and the change detector is configured to actuate the bypass switch in response to rapid changes in the EMF output signal.

13. The magnetic flowmeter of claim 1 wherein the isolated signal comprises a fifth level approximation signal from the wavelet transformer.

14. The magnetic flowmeter of claim 1 wherein the wavelet transformer comprises a sub-band coder.

15. The magnetic flowmeter of claim 14 wherein an output from the sub-band coder provides magnetic flowmeter additional information.

16. The magnetic flowmeter of claim 15 wherein the additional information is selected from the group consisting of information related to diagnostics, chemical reactions, process changes, chemical composition changes and process control.

17. The magnetic flowmeter of claim 1 wherein the signal processor is implemented in a microprocessor system.

18. The magnetic flowmeter of claim 1 including digital communication circuitry disposed to coupled the magnetic flowmeter to a communication bus.

19. The magnetic flowmeter of claim 1 including a digital to analog converter disposed to couple the magnetic flowmeter to the communication bus.

20. The magnetic flowmeter of claim 1 wherein the magnetic flowmeter is adapted to couple to a communication bus and the flowmeter is completely powered by the communication bus.

21. The magnetic flowmeter of claim 20 wherein the communication bus comprises a two wire communication bus which carries a current between 4 mA and 20 mA.

22. A method for high accuracy signal processing in a magnetic flowmeter for processing an electromotive force (EMF) signal generated in response to a magnetic field and velocity of a process fluid, comprising:

digitizing the electromotive force EMF signal;

wavelet transforming the digitized signal and providing a signal output;

isolating the signal output to provide an isolated signal output; and converting the isolated signal output to a signal related to velocity of the process fluid.

23. The method of claim 22 including removing spikes from the digitized EMF signal prior to wavelet transforming the digitized EMF signal.

24. A method for high accuracy signal processing in a magnetic flowmeter for processing an electromotive force (EMF) signal generated in response to a magnetic field and velocity of a process fluid, comprising:

digitizing the EMF signal;

wavelet transforming the digitized signal and providing an isolated signal output;

converting the isolated signal output to a signal related to velocity of the process fluid; and removing spikes from the digitized EMF signal prior to wavelet transforming the digitized EMF signal, wherein removing spikes comprises shifting the digitized EMF signal by at least one period and summing the time shift in the EMF signal to generate a spike signal.

25. The method of claim 24 wherein the spike removing further includes rectifying the spike signal and summing the rectified spike signal with the digitized EMF signal.

26. The method of claim 22 including averaging the digitized EMF signal prior to wavelet transforming the digitized EMF signal.

27. A method for high accuracy signal processing in a magnetic flowmeter for processing an electromotive force (EMF) signal generated in response to a magnetic field and velocity of a process fluid, comprising:

digitizing the EMF signal;

wavelet transforming the digitized signal and providing an isolated signal output;

converting the isolated signal output to a signal related to velocity of the process fluid;

averaging the digitized EMF signal prior to wavelet transforming the digitized EMF signal; and bypassing the averaging by detecting rapid changes in the EMF signal.

28. The method of claim 22 wherein wavelet transforming comprises generating a level 5 approximation signal.

29. The method of claim 22 wherein converting the isolated signal output comprises applying the isolated signal output to a neural network.

30. The method of claim 29 wherein the neural network is trained to provide the signal related to velocity of the process fluid.

31. The method of claim 29 including filtering the output from the neural network with a median filter.

32. The method of claim 22 wherein wavelet transforming the digitized EMF signal comprises applying the EMF signal to a sub-band coder.

33. The method of claim 32 wherein a first output from the sub-band coder is related to fluid velocity and a second output from the sub-band coder provides additional information.

34. The method of claim 33 wherein the additional information is selected from the group consisting of information related to diagnostics, chemical reactions, process changes, chemical composition changes and process control.

35. The method of claim 22 including coupling a signal related to velocity of the process fluid to a communication bus in an industrial process.

36. The method of claim 22 including powering the magnetic flowmeter with power wholly received from a communication bus.

37. The method of claim 36 wherein the communication bus comprises a two wire communication bus which carries a current between 4 mA and 20 mA.

38. A magnetic flowmeter having high accuracy signal processing for measuring flow of a conductive process fluid, comprising:

a flow tube assembly disposed to receive a fluid flow;

means for applying a magnetic field which extends in the fluid flow;

EMF sensing means for sensing an EMF signal generated in the fluid flow due to the applied magnetic field, the velocity of the fluid and noise and responsively providing an EMF output;

an isolated signal output related to the velocity of the fluid; and wavelet transforming means for wavelet transforming the EMF signal output to provide the isolated signal output.

* * * * *